United States Patent [19]
Bax et al.

[11] Patent Number: 6,064,581
[45] Date of Patent: May 16, 2000

[54] HIGH VOLTAGE TRANSFORMER

[75] Inventors: Pieter J. Bax, Drachten; Rudi Jonkman, Eindhoven, both of Netherlands

[73] Assignee: U.S. Philips Corporation, New York, N.Y.

[21] Appl. No.: 09/289,214

[22] Filed: Apr. 9, 1999

[30]     Foreign Application Priority Data

Apr. 9, 1998  [EP]  European Pat. Off. .............. 98201138

[51] Int. Cl.[7] ..................................................... G03C 7/00
[52] U.S. Cl. ............................................. 363/21; 348/377
[58] Field of Search ........................ 363/20, 21; 333/181; 348/377

[56]            References Cited

U.S. PATENT DOCUMENTS

| 4,254,366 | 3/1981 | Truskalo . | |
| 5,844,793 | 12/1998 | Goseberg | 363/20 |

FOREIGN PATENT DOCUMENTS

| 50-143971 | 6/1977 | Japan | 363/20 |

OTHER PUBLICATIONS

U.S. 4377842 A (Craig S. Cambier), Mar. 22, 1983, abstract.
JP 61251373 A (NEC Home Electronics Ltd.), Nov. 8, 1986.
DE 3830823 A1 (Licentia Patent–Verwaltungs–GmbH), Mar. 22, 1990, abstract.
U.S. 4,254,366 A (Walter Truskalo), Mar. 3, 1981, abstract.

*Primary Examiner*—Peter S. Wong
*Assistant Examiner*—Gary Laxton
*Attorney, Agent, or Firm*—John C. Fox

[57]            ABSTRACT

A high voltage transformer (Tr) includes a primary winding (Lp), secondary windings (Ls1, Ls2, Ls3), and diodes (Di) coupled between successive secondary windings. The polarity of the diodes and the secondary windings is selected such that the flyback voltages across each of the secondary windings are summed via conductive diodes during at least a part of a flyback period (Tf) for generating a high voltage. A damp-circuit (1) comprises a rectifier element, a load (L), and a further winding (Ls4) of the high voltage transformer. These elements are arranged with respect to one of the secondary windings such that the further winding and the one of the secondary windings form a capacitance (Cd) across the load. The diode (D) is non-conductive during the flyback period. In this way, electrical oscillations of the high voltage transformer are damped.

19 Claims, 2 Drawing Sheets

HIGH VOLTAGE TRANSFORMER

BACKGROUND OF THE INVENTION

The invention relates to a high voltage transformer as defined in the precharacterizing part of claim 1. The invention also relates to a display apparatus with a display device for receiving a high voltage from such a high voltage transformer as defined in the precharacterizing part of claim 7. Such a high voltage transformer is especially suitable for generating an anode voltage for a cathode ray tube.

Prior art DE-A-3830823 discloses a diode split transformer for generating the high anode voltage. The diode split transformer comprises a primary winding and a series arrangement of high voltage sections each of which comprises a series arrangement of a diode and a secondary winding. The diodes and the secondary windings all have a polarity to sum the voltages across the secondary windings when the diodes conduct during the flyback period. A damp-circuit is connected across one of the secondary windings to suppress a resonance of the transformer. The damp-circuit comprises a parallel arrangement of a load and a capacitor. The parallel arrangement is arranged in series with a diode. The diode has a polarity such that it does not conduct during the flyback period.

It is a drawback of the prior art damp circuit that the capacitor of the damp circuit is bulky as it has to withstand a high voltage.

OBJECT AND SUMMARY OF THE INVENTION

It is an object of the invention to provide a transformer with a damp circuit which requires less space.

To this end, a first aspect of the invention provides a high voltage transformer with a damp-circuit as defined in claim 1. A second aspect of the invention provides a display apparatus with a high voltage transformer as defined in claim 7. Advantageous embodiments are defined in the dependent claims.

The damp-circuit comprises a further winding of the transformer instead of the capacitor. The further winding, the diode, and the load are arranged with respect to one of the secondary windings such that the further winding and the said one of the secondary windings form a capacitance across the load. In the claims, the secondary windings are referred to as high voltage windings.

The embodiment of the invention as claimed in claim 3 has the advantage with respect to the embodiment of the invention as claimed in claim 2 that during the flyback period no energy is dissipated in the load.

The embodiment of the invention as claimed in claim 5 has the advantage that the secondary windings and the further winding are all wound over each other, causing a large capacitance.

The embodiment of the invention as claimed in claim 6 has the advantage that the two windings form a large capacitance and are coupled very well. The excellent coupling provides substantially equal voltages across both windings, which has the advantage that substantially no AC voltage occurs across the capacitance.

These and other aspects of the invention will be apparent from and elucidated with reference to the accompanying drawings.

DESCRIPTION OF THE PREFERRED EMBODIMENTS

Figure 1:
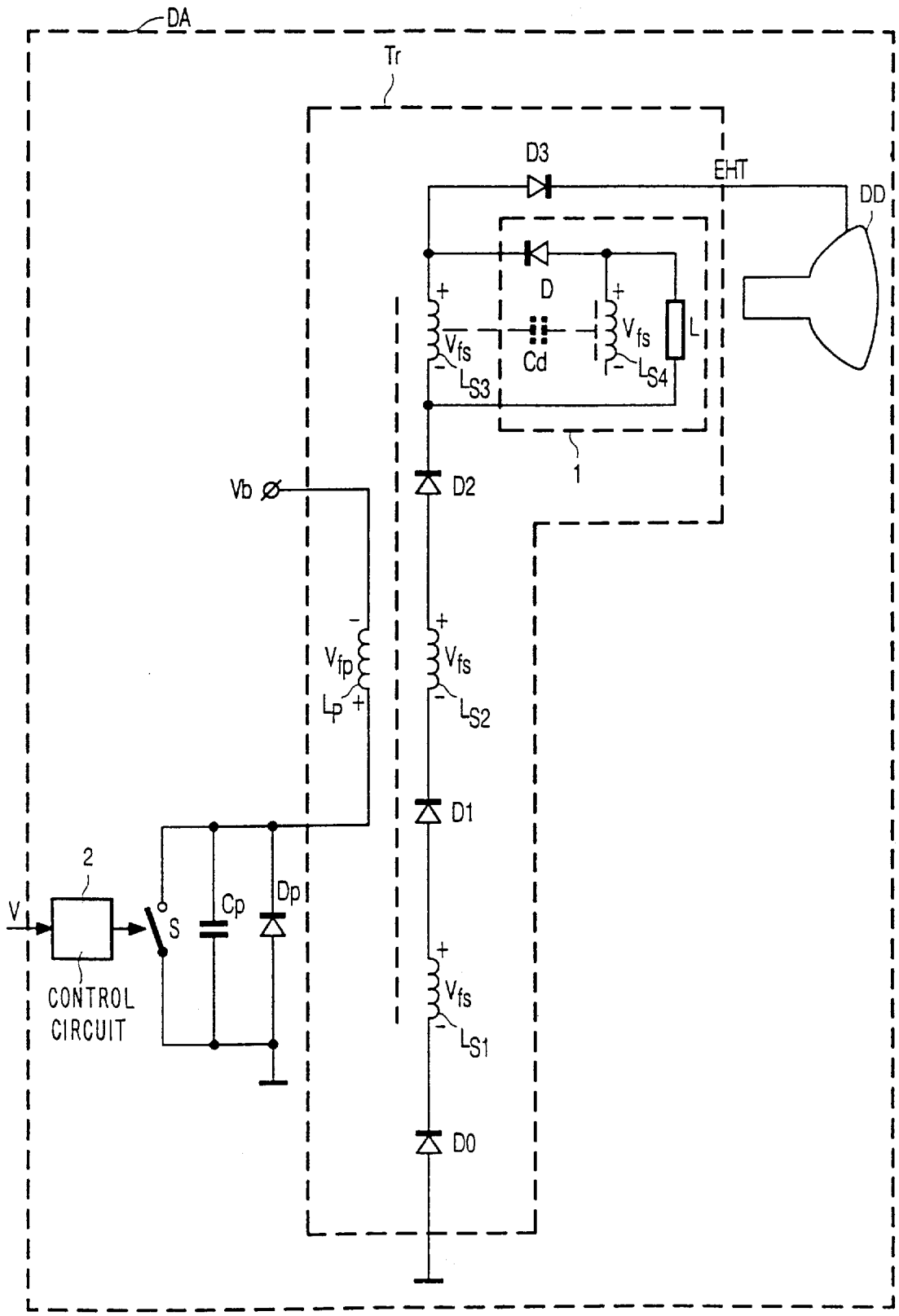
FIG. 1 shows a block diagram of a display apparatus which comprises a high voltage transformer with a damp-circuit according to a first embodiment of the invention.

FIG. 1 shows a block diagram of a display apparatus DA which comprises a high voltage transformer Tr with a damp-circuit 1 according to a first embodiment of the invention.

The display apparatus DA comprises a control circuit 2, a high voltage transformer Tr, a capacitor Cp, a diode Dp, and a display device DD. The display apparatus may display television or computer generated video signals. A series arrangement of a primary winding Lp of the high voltage transformer Tr and a switching element S receives a supply voltage Vb. A parallel arrangement of the capacitor Cp and the diode Dp is connected between ground and the junction of the primary winding Lp and the switching element S. The anode of the diode Dp is connected to ground. The on- and off-periods of the switching element S are controlled by the control circuit 2 in dependence on a line synchronization signal which is separated from the input video signal V. It is also possible that the line synchronization signal is available directly, as is common practice in computer graphics adapters. The high voltage transformer Tr generates the high voltage EHT with a series arrangement of diodes Di and secondary windings Lsi. A first diode D0 has an anode coupled to ground and a cathode coupled to the first secondary winding Ls1. A second diode D1 is coupled between the first secondary winding Ls1 and the second secondary winding Ls2. A third diode D2 is coupled between the second secondary winding Ls2 and the third secondary winding Ls3. A fourth diode D3 is coupled between the third secondary winding Ls3 and a high voltage contact of the display device DD (for example, an anode contact of a cathode ray tube DD).

A damp-circuit 1 is arranged in parallel with the third secondary winding Ls3. The damp-circuit 1 comprises a diode D with a cathode coupled to a junction of the third secondary winding Ls3 and the fourth diode D3, and an anode coupled via a load L to a junction of the third secondary winding Ls3 and the third diode D2. The damp-circuit 1 further comprises a fourth secondary winding Ls4 with a first end connected to the anode of the diode D. A second end of the fourth secondary winding Ls4 floats. A distributed capacitance Cd between the fourth secondary winding Ls4 and the third secondary winding Ls3 may be considered as a lumped capacitance across the load L.

At the start of the off-period of the switching element S, a current flowing in tile primary winding Lp is forced to flow into the capacitor Cp to generate a high flyback voltage Vfp across the primary winding Lp. This high flyback voltage Vfp across the primary winding Lp is transformed into high flyback voltages Vfs across the secondary windings Lsi. All diodes Di (D0 to D3) have a polarity to rectify these high flyback voltages Vfs across the secondary windings Lsi. Consequently, all diodes Di conduct during at least a part of the flyback period Tf during which the switching element S is open. All diodes Di are non-conductive outside the flyback period Tf. The operation of the damp-circuit 1 will be elucidated with respect to FIG. 2.

Figure 2:
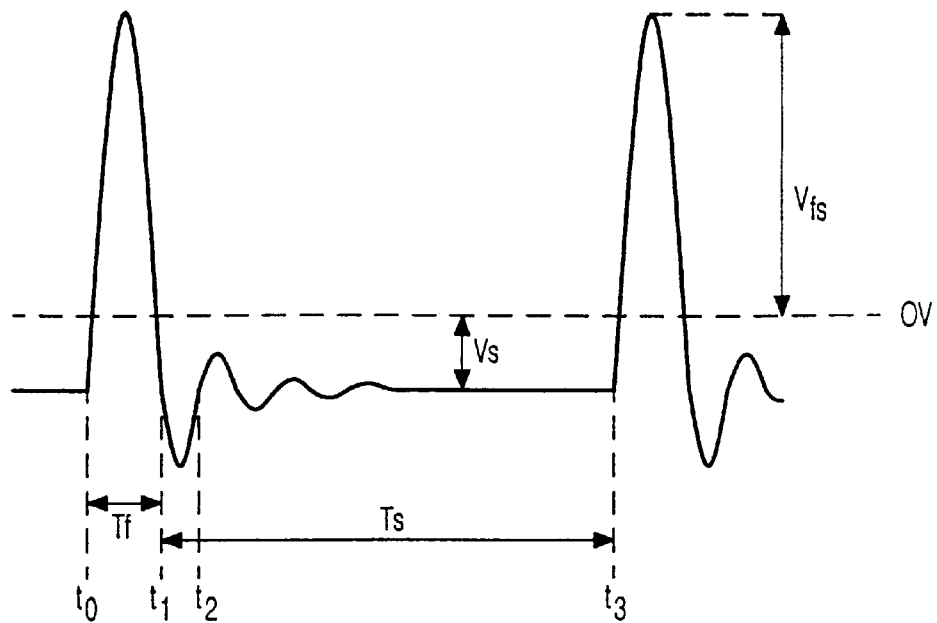
FIG. 2 shows a waveform across a secondary winding of a high voltage transformer without a damp-circuit.

FIG. 2 shows a waveform across a secondary winding Lsi of the high voltage transformer Tr without a damp-circuit 1.

At instant t0 at which the flyback period Tf starts, the switching element S is opened, and a flyback voltage Vfs is generated. The flyback period Tf ends at t1. During the flyback period Tf, a conducting period of the diodes Di depends on the high voltage EHT drop caused by the current drawn by the display device DD during the period of time the diodes Di are non-conductive. At t1, the diode Dp (FIG. 1) becomes conductive and the scan period Ts starts. The supply voltage Vb occurs across the primary winding Lp and the supply voltage Vb is transformed to a scan voltage Vs across each of the secondary windings Lsi. In a stable situation (at the end of the scan period Ts, just before instant t3), a nominal scan voltage Vs occurs, which is determined by the winding ratio between the secondary winding Lsi and the primary winding Lp. At the start t1 of the scan period Ts, energy in the spread inductance of the high voltage transformer Tr causes oscillations around the nominal value of the scan voltage Vs.

At the start t1 of the scan period Ts, the capacitor Cd in the damp-circuit 1 is charged to the nominal value of the scan voltage Vs. As soon as the scan voltage Vs drops below its nominal value the diode D becomes conductive and the energy in the spread inductance is dissipated in the load L. The impedance of the load L should be selected as high as possible to prevent a significant load on the high voltage transformer Tr during the scan period. However, the impedance of the load should be small enough to dissipate the energy substantially during the first negative half period of the oscillation.

Figure 3:
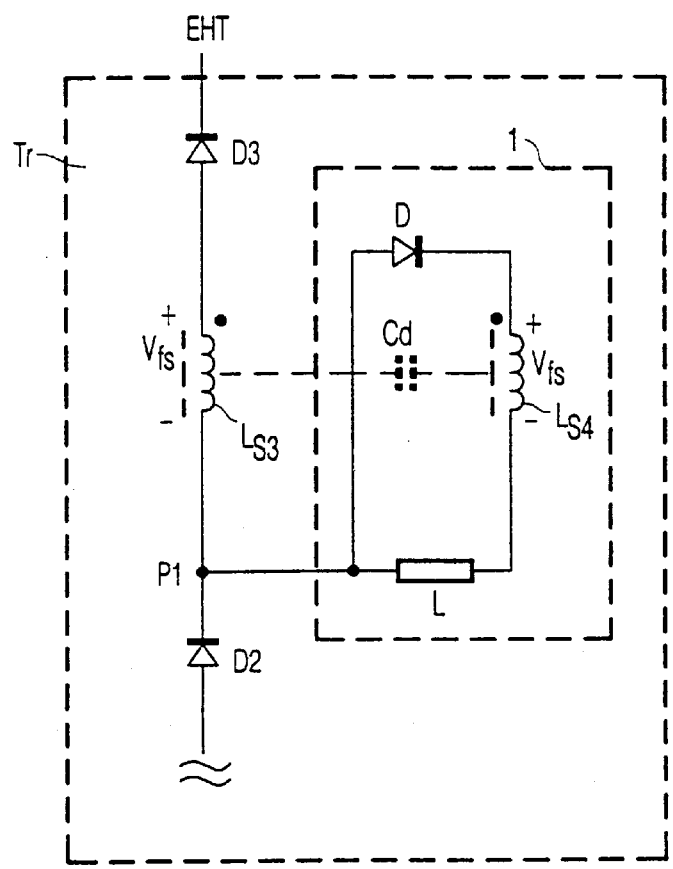
FIG. 3 shows part of a high voltage transformer with a damp-circuit according to a second embodiment of the invention.

FIG. 3 shows part of a high voltage transformer Tr with a damp-circuit 1 according to a second embodiment of the invention. In FIG. 3 is shown the part of the high voltage transformer Tr of FIG. 1 which comprises the third diode D2, the third secondary winding Ls3, and the fourth diode D3. Again, the damp-circuit 1 comprises a fourth secondary winding Ls4 which forms the distributed capacitance Cd with the third secondary winding Ls3. A first end of the fourth secondary winding Ls4 is connected to a junction P1 of the third secondary winding Ls3 and the third diode D2 via the load L. A second end of the fourth secondary winding Ls4 is connected to the junction P1 via the diode D. The anode of the diode D is connected to the junction P1. As indicated by the dots near to the third Ls3 and the fourth Ls4 secondary winding, both the third and the fourth secondary windings Ls3, Ls4 have the same polarity.

Also in this embodiment of the damp-circuit 1 according to the invention, the diode D starts conducting as soon as the scan voltage Vs drops below its nominal value, and consequently the oscillations are suppressed.

It should be noted that the above-mentioned embodiments illustrate rather than limit the invention, and those skilled in the art will be able to design many alternative embodiments without departing from the scope of the appended claims.

The switching element S may be a bipolar transistor, a field effect transistor, or any other suitable semiconductor switching element.

The high voltage transformer Tr with the damp circuit 1 according to the invention may be used in a standalone high voltage generator as shown, or in a combined line deflection and high voltage generating circuit wherein the primary winding Lp of the high voltage transformer Tr is used as a choke for the line deflection circuit. In the embodiments of the invention, the third secondary winding Ls3 is the outer wound secondary winding of the secondary windings Lsi contributing to the high voltage EHT. By selecting the fourth secondary winding Ls4 to be the outer wound secondary winding of the high voltage transformer Tr, this fourth winding Ls4 has a very good coupling with the third winding Ls3 and moreover shields the transformer, thereby reducing Electro- Magnetical Interference.

The fourth secondary winding Ls4 of the damp-circuit 1 is wound directly over the third secondary winding Ls3 to obtain a good coupling and a large capacitance Cd. The fourth secondary winding Ls4 may also be wound directly over another one of the secondary windings Lsi. In this case, the other components of the damp-circuit 1 have to be rearranged with respect to this other one of the secondary windings Lsi. Although less favorable, it is also possible to use an extra winding between the primary winding Lp and the secondary windings Lsi as the fourth secondary winding Ls4.

The number of secondary windings Lsi and the associated diodes Di may be selected to fit a maximum allowable or desirable voltage across each secondary winding Lsi or each diode Di.

Preferably, the fourth secondary winding Ls4 and the third secondary winding Ls3 have a same number of turns. However, the oscillations will also be damped if the number of turns of the fourth secondary winding Ls4 and the third secondary winding Ls3 differ. However, too large a difference may cause too large a current through the capacitor Cd.

The so called foot-diode D0, which enables the high voltage transformer to be operated at a higher switching frequency, may be omitted.

In summary, in a preferred embodiment, the damp-circuit 1 according to the invention is applied in a layer-wound diode split transformer Tr in which the secondary windings Lsi are formed of a conductive foil. Such a layer-wound transformer Tr is often used to generate the anode voltage EHT required by a cathode ray tube DD in a display apparatus DA. Such a layer-wound diode split transformer Tr comprises a primary winding Lp, secondary windings Lsi, and diodes Di coupled between successive secondary windings Lsi. A polarity of the diodes Di and the secondary windings Lsi is selected such that the flyback voltages Vfs across each of the secondary windings Lsi are summed via conductive diodes Di during at least part of a flyback period Tf for generating the high voltage EHT.

The damp-circuit 1 comprises a rectifier element D, a load L, and a further winding Ls4 of the high voltage transformer Tr. These elements are arranged with respect to one of the secondary windings Lsi such that the further winding Ls4 and said one of the secondary windings Lsi form a capacitance Cd across the load L, and such that the diode D is non-conductive during the flyback period Tf. In this way, electrical oscillations of the high voltage transformer Tr are damped.

In the claims, any reference signs placed between parenthesis shall not be construed as limiting the scope of the claims.

We claim:

1. A high voltage transformer comprising:

a primary winding, high voltage secondary windings coupled to the primary winding for generating a high voltage during a flyback period, a damp-circuit comprising a rectifier element and a load, the rectifier element being arranged so as to be non-conductive during the flyback period, characterized in that the damp-circuit further comprises a further winding of the high voltage transformer, the further winding, the rectifier element and the load being arranged with respect to one of the high voltage windings such that the further winding and said one of the high voltage windings effectively form a capacitance across the load.

2. A high voltage transformer as claimed in claim 1, characterized in that
    a series arrangement of the rectifier element and the load is coupled in parallel with said one of the high voltage windings,
    the further winding has a first end coupled to a junction point of the rectifier element and the load, and a second floating end, and
    said one of the high voltage windings has an end coupled to the rectifier element, said end having the same polarity as the first end of the further winding.

3. A high voltage transformer as claimed in claim 1, characterized in that
    a first end of said one of the high voltage windings is coupled to an end of another one of the high voltage windings via a further rectifier element, the further rectifier element being conductive in the flyback period,
    a first end of the rectifier element and a first end of the load are both coupled to said first end of said one of the high voltage windings, the further winding being coupled between a second end of the rectifier element and a second end of the load, and
    said first end of said one of the high voltage windings has the same polarity as an end of the further winding coupled to the load.

4. A high voltage transformer as claimed in claim 1, characterized in that the load is a resistor.

5. A high voltage transformer as claimed in claim 1, characterized in that the high voltage transformer is a layer wound diode split transformer.

6. A high voltage transformer as claimed in claim 5, characterized in that the further winding and said one of the high voltage windings are wound directly over each other.

7. A display apparatus comprising: a display device for receiving a high voltage from a high voltage transformer, the high voltage transformer comprising:
    a primary winding,
    high voltage windings coupled to the primary winding for generating a high voltage during a flyback period,
    a damp-circuit comprising a rectifier element and a load, the rectifier element being arranged so as to be non-conductive during the flyback period, characterized in that the damp-circuit further comprises a further winding of the high voltage transformer, the further winding, the rectifier element and the load being arranged with respect to one of the high voltage windings such that the further winding and said one of the high voltage windings form a capacitance across the load.

8. The high voltage transformer as claimed in claim 1 wherein the damp-circuit is devoid of any discrete capacitor components.

9. The high voltage transformer as claimed in claim 1 further comprising;
    a plurality of diodes connected so that each pair of successive high voltage secondary windings has at least one diode connected therebetween,
    a high voltage terminal connected to a first end high voltage secondary winding via a first diode, and
    a reference voltage terminal connected to a second end high, voltage secondary winding via a second diode.

10. A high voltage diode split transformer comprising:
    a primary winding,
    a plurality of diodes,
    a plurality of series connected high voltage secondary windings coupled to the primary winding so as to generate a high voltage during a flyback period,
    each of said plurality of diodes being connected between a respective pair of successive high voltage secondary windings, and
    a damping circuit including a rectifier element, a load and a further winding of the high voltage transformer all electrically coupled to one of said high voltage secondary windings such that the further winding and said one of said high voltage secondary windings form a capacitance coupled to the load, and wherein
    the rectifier element is polarized relative to the transformer windings so that it is non-conductive during the flyback period, whereby
    electrical oscillations in the high voltage transformer are damped.

11. The high voltage diode split transformer as claimed in claim 10 wherein said plurality of diodes are polarized relative to the transformer windings so that they are non-conductive outside of the flyback period.

12. The high voltage diode split transformer as claimed in claim 10 wherein the load is a resistor and the only discrete elements in the damping circuit are the rectifier element, the load resistor and the further winding.

13. The high voltage diode split transformer as claimed in claim 10 wherein the further winding is wound directly over said one of the high voltage secondary windings and said further winding and said one of the high voltage secondary windings have approximately the same number of turns.

14. The high voltage diode split transformer as claimed in claim 10 wherein the rectifier element and the load are connected in a series circuit in parallel with said one of the high voltage secondary windings, and
    the further winding has a first end coupled to a junction point between the rectifier element and the load and a second end which is floating.

15. The high voltage diode split transformer as claimed in claim 10 wherein the rectifier element, the further winding and the load are connected in a closed loop circuit having one terminal of the rectifier element connected to a junction point between said one of the high voltage windings and one of its connected diodes.

16. The high voltage diode split transformer as claimed in claim 10 wherein the high voltage windings are wound in overlapping layers around the primary winding and with the further winding wound in a layer around the outermost winding of the layer wound high voltage secondary windings.

17. The display apparatus as claimed in claim 7 further comprising:
    a semiconductor switching element coupled via said primary winding to a terminal which supplies a DC operating voltage for the apparatus,
    a capacitor and a further diode each coupled across the semiconductor switching element, and
    means for supplying a switching voltage to a control electrode of the semiconductor switching element.

18. The display apparatus as claimed in claim 17 further comprising a plurality of diodes each of which is connected between a respective pair of successive high voltage secondary windings and the diodes are polarized to conduct during at least a part of the flyback period, and wherein said flyback period occurs when the semiconductor switching element is cut-off by the switching voltage.

19. The high voltage transformer as claimed in claim 1 wherein the damp-circuit is electrically coupled to said one of the high voltage windings.

* * * * *